United States Patent
Caldwell et al.

(10) Patent No.: US 11,944,953 B2
(45) Date of Patent: Apr. 2, 2024

(54) METHOD OF FORMING VOC AND ODOR REDUCING BUILDING PANELS

(71) Applicant: ARMSTRONG WORLD INDUSTRIES, INC., Lancaster, PA (US)

(72) Inventors: Kenneth G. Caldwell, Mountville, PA (US); Steven L. Masia, Lancaster, PA (US); Gourish Sirdeshpande, Lancaster, PA (US); Michelle X Wang, Lititz, PA (US)

(73) Assignee: AWI Licensing LLC, Wilmington, DE (US)

( * ) Notice: Subject to any disclaimer, the term of this patent is extended or adjusted under 35 U.S.C. 154(b) by 384 days.

(21) Appl. No.: 17/241,422

(22) Filed: Apr. 27, 2021

(65) Prior Publication Data

US 2021/0245136 A1 Aug. 12, 2021

Related U.S. Application Data

(60) Division of application No. 16/993,786, filed on Aug. 14, 2020, now Pat. No. 11,014,066, which is a continuation of application No. 16/252,864, filed on Jan. 21, 2019, now Pat. No. 10,780,415, which is a continuation of application No. 15/706,870, filed on Sep. 18, 2017, now Pat. No. 10,183,271, which is a division of application No. 14/970,308, filed on Dec. 15, 2015, now Pat. No. 9,764,307.

(51) Int. Cl.

| | |
|---|---|
| *B01J 20/22* | (2006.01) |
| *B01J 20/04* | (2006.01) |
| *B01J 20/10* | (2006.01) |
| *B01J 20/12* | (2006.01) |
| *B01J 20/28* | (2006.01) |
| *B01J 20/30* | (2006.01) |
| *B01J 20/32* | (2006.01) |
| *E04B 9/00* | (2006.01) |
| *E04B 9/04* | (2006.01) |
| *E04C 2/00* | (2006.01) |

(52) U.S. Cl.
CPC ............. *B01J 20/22* (2013.01); *B01J 20/043* (2013.01); *B01J 20/103* (2013.01); *B01J 20/12* (2013.01); *B01J 20/28035* (2013.01); *B01J 20/3042* (2013.01); *B01J 20/3236* (2013.01); *E04B 9/001* (2013.01); *E04B 9/045* (2013.01); *E04C 2/00* (2013.01)

(58) Field of Classification Search
CPC ........ B01J 20/22; B01J 20/043; B01J 20/103; B01J 20/12; B01J 20/28035; B01J 20/3042; B01J 20/3236; E04B 9/001; E04B 9/045; E04C 2/00
USPC ........................................................ 502/401
See application file for complete search history.

(56) References Cited

U.S. PATENT DOCUMENTS

| | | |
|---|---|---|
| 4,565,693 A | 1/1986 | Marschner |
| RE33,773 E | 12/1991 | Gurreo et al. |
| 5,415,682 A | 5/1995 | Zarchy et al. |
| 8,598,069 B2 | 12/2013 | Barrows et al. |
| 9,764,307 B2 | 9/2017 | Caldwell |
| 10,780,415 B2 * | 9/2020 | Caldwell .............. B01J 20/3236 |
| 11,014,066 B2 * | 5/2021 | Caldwell .................. B01J 20/12 |
| 2006/0052502 A1 | 3/2006 | Zhao et al. |
| 2007/0179268 A1 | 8/2007 | Lejeune et al. |
| 2007/0191256 A1 | 8/2007 | Fossum et al. |
| 2011/0171482 A1 | 7/2011 | Fujii et al. |
| 2013/0023612 A1 | 1/2013 | Lu et al. |
| 2014/0165844 A1 | 6/2014 | Okuyama |
| 2015/0051334 A1 | 2/2015 | Wu et al. |
| 2018/0009252 A1* | 1/2018 | Zhou .......................... B41J 2/01 |

FOREIGN PATENT DOCUMENTS

| | | |
|---|---|---|
| EP | 0379728 A2 | 1/1990 |
| JP | 2005-154625 A | 6/2005 |
| JP | 2007-270019 A | 10/2007 |

* cited by examiner

*Primary Examiner* — Edward M Johnson
(74) *Attorney, Agent, or Firm* — Patrick Sheldrake

(57) ABSTRACT

Described herein are methods of forming a VOC and odor-reducing building panel. The methods include providing a substrate; applying a wet-state coating to a major surface of the substrate, the wet-state coating comprising carrier comprising water; and drying the wet-state coating, thereby evaporating at least 95 wt. % of the carrier to form a dry-state coating.

20 Claims, No Drawings

METHOD OF FORMING VOC AND ODOR REDUCING BUILDING PANELS

CROSS-REFERENCE TO RELATED APPLICATIONS

This application is a divisional of U.S. patent application Ser. No. 16/993,786, filed on Aug. 14, 2020, which is a continuation of U.S. patent application Ser. No. 16/252,864, filed on Jan. 21, 2019, issued as U.S. Pat. No. 10,780,415, which is a continuation of U.S. patent application Ser. No. 15/706,870, filed on Sep. 18, 2017, issued as U.S. Pat. No. 10,183,271, which is a divisional of U.S. patent application Ser. No. 14/970,308 filed on Dec. 15, 2015, issued as U.S. Pat. No. 9,764,307. The disclosure of the above applications are incorporated herein by reference in their entirety.

FIELD OF THE INVENTION

The present invention relates generally to a coating suitable for neutralizing VOCs and/or odors in a closed environment. The coating composition may comprise an odor-reducing coating composition that may be applied to one or more building panels.

BACKGROUND OF THE INVENTION

Previous VOC and/or odor-reducing building panels were limited by lack of variety of VOCs and/or odors that could be neutralized as well as the limited extent to which VOCs and/or odors could be neutralized over a set period of time. Furthermore, previous attempts at forming a VOC and/or odor-reducing panel were limited by application methodologies that either degraded the neutralizing agent during manufacture or limited the amount of neutralizing agent that could be properly applied.

BRIEF SUMMARY OF THE INVENTION

In certain embodiments, the present invention may be directed to a coating composition for reducing VOC and odors, the coating composition comprising: a solid component comprising a blend of ethylene urea, silica gel, porous $CaCO_3$, and a liquid carrier comprising water. The porous $CaCO_3$ may have a surface area ranging from about 120 $m^2/g$ to about 160 m2/g, optionally about 144 $m^2/g$. In certain embodiments, the liquid carrier is present in an amount ranging from about 25 wt. % to about 75 wt. %, based on the total weight of the coating composition. In certain embodiments, the solid component further comprises a rheology modifier selected from silicate mineral, alkali-swellable compounds, and combinations thereof, optionally present in an amount ranging from about 0.5 wt. % to about 55 wt. %, based on the total weight of the solid component. In certain embodiments, the silica gel has a particle size ranging from about 0.5 μm to about 120 μm. In certain embodiments, the silica gel is present in an amount ranging from about 5 wt. % to about 40 wt. %, based on the total weight of the solid component. In certain embodiments, the ethylene urea and the silica gel are present in a weight ratio ranging from about 1:1 to about 1:8. In certain embodiments, the coating composition comprises a first surfactant and a second surfactant, and wherein the first surfactant is non-ionic and the second surfactant is ionic.

In further embodiments, the invention is directed towards a coating composition for reducing VOC and odors, the coating composition comprising: a solid component comprising a blend of silica gel, a surfactant, a rheology modifier; porous $CaCO_3$; and a liquid carrier comprising water. In certain embodiments, the carrier is present in an amount ranging from about 25 wt. % to about 75 wt. %, based on the total weight of the coating composition. In certain embodiments, the silica gel has a particle size ranging from about 0.5 μm to about 120 μm. In certain embodiments, the rheology modifier is selected from silicate mineral, alkali-swellable compounds, and combinations thereof. In certain embodiments, the rheology modifier is present in an amount ranging from about 0.1 wt. % to about 55 wt. %, based on the total weight of the solid component. In certain embodiments, the surfactant is present in an amount ranging from about 0.1 wt. % to about 17.0 wt. %, based on the total weight of the dry component. In certain embodiments, the surfactant is non-ionic and optionally is present in an amount ranging from about 0.1 wt. % to about 0.5 wt. % based on the total weight of the dry component. In certain embodiments, the surfactant is ionic and is optionally, present in an amount ranging from about 1 wt. % to about 7 wt. % based on the total weight of the dry component. In certain embodiments, the surfactant is an emulsifier that is present in an amount ranging from about 2 wt. % to about 12 wt. % based on the total weight of dry component. In certain embodiments, the coating composition further comprises filler having a particle size ranging from about 0.1 μm to 300 μm. In certain embodiments, the porous $CaCO_3$ has a surface area ranging from about 120 $m^2/g$ to about 160 $m^2/g$—preferably about 144 $m^2/g$.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following description of the preferred embodiment(s) is merely exemplary in nature and is in no way intended to limit the invention, its application, or uses.

In the description of embodiments of the invention disclosed herein, any reference to "about" or "substantially" refers to a difference of +/−5% of the referenced amount. In the description of embodiments of the invention disclosed herein, any reference to "substantially free" refers to less than 3 wt. % of the referenced amount.

The present invention is directed to installation systems comprising at least one building panel, the building panel comprising a substrate and a VOC and odor-reducing coating (referred to herein as the "coating") applied thereto. The coating comprises a VOC and odor-reducing composition (referred to herein as "reducing composition") that includes a blend of a first component that comprises a urea compound and a second component that comprises silicon dioxide (as referred to as silica).

The substrate may be formed from an organic material, an inorganic material, and combinations thereof. Non-limiting examples of inorganic material include gypsum board (e.g., sheetrock), calcium carbonate, clay (i.e., kaolin), expanded-perlite, mineral wool fibers (e.g., slag wool, rock wool, and stone wool), fiberglass, or a combination thereof. Non-limiting examples of organic material include cellulosic fibers (e.g. paper fiber, hemp fiber, jute fiber, flax fiber, or other natural fibers), polymer fibers (including polyester, polyethylene, and/or polypropylene), protein fibers (e.g., sheep wool), and combinations thereof.

The substrate may be a porous structure formed from organic and/or inorganic fibers that are bonded together with the aid of a binder. Non-limiting examples of binder may include a starch, latex, or the like. The substrate may be a porous body. The porosity of the substrate may allow the building panel to exhibit an acoustical absorbency high enough to reduce noise in an interior environment, thereby allowing the building panel to function as an acoustical ceiling panel—as discussed further herein.

The substrate may comprise a first major surface opposite a second major surface and side surfaces that extends between the first major surface and the second major surface. The substrate may have a thickness as measured from the first major surface to the second major surface—the thickness ranging from about 0.25 inches to about 2 inches—including all values and sub-ranges there-between. The coating may be applied to at least one of the first major surface or the second major surface of the substrate.

The coating may be applied to at least one of the first or second major surfaces of the substrate in a wet-state. The term "wet-state" refers to the coating comprising the reducing composition as well as a carrier—such as water. The carrier may comprise at least 95 wt. % of water—based on the total weight of the carrier. In a preferred embodiment, the carrier is 100 wt. % of water. After application of the coating in the wet-state, the carrier may be driven off yielding the coating in a dry-state applied to the substrate. The term "dry-state" refers to the coating being substantially solid at room temperature (i.e., about 21° C. to about 23° C.) have less than 5 wt. % of moisture and being substantially free of carrier based on the total weight of the coating.

In the dry-state, the coating may be present on at least one of the first or second major surfaces of the substrate in a total amount ranging from about 50 g/m$^2$ to about 400 g/m$^2$—including all values and sub-ranges there-between. In a preferred embodiment, the dry-state coating may be present on at least one of the first or second major surfaces of the substrate in a total amount ranging from about 75 g/m$^2$ to about 200 g/m$^2$—including all values and sub-ranges there-between. The total amount of the coating in the dry-state may be the result of a single or multiple applications of the wet-state coating—as discussed further herein.

The reducing composition of the present invention includes a blend of a first component and a second component. The first component may include a urea compound having the general formula I:

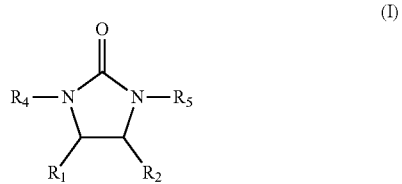

(I)

Wherein $R_1$ and/or $R_2$ are selected from the group consisting of H, OH, NH$_2$, NHR$_3$ (where $R_3$ is selected from the group consisting of alkyl (C$_1$-C$_6$), alkyloxy, and alkyamine) and COOH; and $R_4$ and $R_5$ are selected from the group consisting of H, alkyl (C$_1$-C$_6$), and alkyloxy; wherein at least one of $R_4$ or $R_5$ is a hydrogen. In a preferred embodiment, $R_1$, $R_2$, $R_4$, and $R_5$ are each H—i.e., the urea compound is ethylene urea (as referred to as N,N-Ethylene urea or 2-imidazolidone). The first component may be present in an amount ranging from about 2 wt. % to about 18 wt. % (including all values and sub-ranges there-between)—based on the total weight of the coating in the dry-state. In a preferred embodiment, the first component may be present in an amount ranging from about 5 wt. % to about 13 wt. % (including all values and sub-ranges there-between)—based on the total weight of the coating in the dry-state.

The second component of the reducing composition may comprise particles of silicon dioxide (also referred to as silica). The silicon dioxide may have a particle size ranging from about 0.5 μm to about 120 μm—including all values and sub-ranges there-between. In a preferred embodiment, the silicon dioxide may have a particle size ranging from about 30 μm to about 60 μm—including all values and sub-ranges there-between. The silicon dioxide may be in the form of silica gel.

The term "silica gel" according to the present invention refers to silicon dioxide formed from sodium silicate having pores that are nano-scaled or micro-scaled. The silica gel may serve as a desiccant—i.e., a hygroscopic substance (absorbs water) that induces or sustains a state of dryness in the vicinity surrounding the desiccant. The second component of the reducing composition may be present in an amount ranging from about 5 wt. % to about 40 wt. % (including all values and sub-ranges there-between)—based on the total weight of the coating in the dry-state. In some embodiments, the second component of the reducing composition may be present in an amount ranging from about 12 wt. % to about 28 wt. % (including all values and sub-ranges there-between)—based on the total weight of the coating in the dry-state. In a preferred embodiment, the second component of the reducing composition may be present in an amount ranging from about 12 wt. % to about 24 wt. % (including all values and sub-ranges there-between)—based on the total weight of the coating in the dry-state.

The first component and the second component of the reducing composition may present in in a weight ratio that ranges from about 1:1 to about 1:8—including all ratios and ranges there-between. In a preferred embodiment, the first component and the second component may present in the reducing composition in a weight ratio that ranges from about 1:2 to about 1:4—including all ratios and ranges there-between.

It has been discovered that by using the combination of the first component and the second in the reducing composition, the resulting coating will neutralize a greater variety of VOCs as well as complex odors when compared to building panels comprising using previously known VOC and/or odor-reducing coating compositions based on zeolites, zinc salts, and mineral oils, cyclodextrin (e.g., Febreeze), and amino-silanes. Specifically, the coating of the present invention has been observed to be effective in reducing and/or neutralizing a wide range of VOCs—including but not limited to ammonia (NH$_3$), NO$_X$, xylene, acetone, butyric acid, benzene, toluene, pyridine, acetic acid, triethylamine, and low molecular weight aldehydes and ketones, such as acetaldehyde, and formaldehyde—as well as a wide range of complex odors, such as bathroom odors (e.g., urine, feces, flatulence), cooking odors (e.g., popcorn, cumin, burnt foods), pet odors (e.g., dog and cat odor, cat food), cleaning materials, and tobacco smoke.

Previous VOC and/or odor-reducing coating compositions were incapable of neutralizing such a diverse body of odors. For example, amino-silane based VOC and/or odor-reducing coating compositions may be capable of neutralizing only aldehyde-based VOC odors. Other examples include zeolite-based VOC and/or odor-reducing coating compositions, which are capable of neutralizing VOC based odors but not complex odors such as odors from bathroom use or tobacco smoke.

In addition to neutralizing a greater variety of odors, it has been surprisingly discovered that the coating of the present invention will neutralize those VOCs and/or odors to a greater extent and do so in less time and have longer sustainability as compared to previously known VOC and/or odor-reducing compositions—as described in greater detail herein. For example, coatings based on mineral oils are not effective as a VOC and/or odor-reducing coating because mineral oils evaporate quickly and therefore have no sustainability over the life-span of a permanently installed building panel. Additionally, coatings based on cyclodextrin are not effective as VOC and/or odor-reducing coatings because, after an initial VOC and/or odor absorption, the cyclodextrin cannot re-absorb additional amounts of VOC and/or odors. Therefore, cyclodextrin provides little-to-no sustainability over the life-span of a permanently installed building panel.

The coating of the present invention is also less susceptible moisture concerns as compared to previously known VOC and/or odor-reducing coatings, Specifically, the VOC and odor neutralization and/or reduction of the reducing composition is substantially the same at high relative humidity (RH) as compared to that at low RH. Therefore, coating composition of the present invention may be useful in neutralizing VOCs and odors in a greater variety of climates as compared to the previous VOC and/or odor-reducing coatings where the neutralization and/or reduction was susceptible degradation based on the moisture content of the surrounding environment. For example, zeolite based VOC and/or odor-reducing coatings are ineffective at neutralizing VOCs and/or odors in high RH and, therefore, are unsuitable for high humidity climates (e.g., swamp land, tropical regions, etc.).

As previously discussed, the building panel of the present invention may be manufactured by applying the wet-state coating composition to the substrate. In the wet-state, the coating composition comprises the reducing composition and a carrier comprising water—as well as other components as described further herein. The carrier may be present in an amount ranging from about 25 wt. % to about 75 wt. % based on the total weight of the wet-state coating composition—thereby yielding a solids content of about 25 wt. % to about 75 wt. %—including all percentages and sub-ranges there-between. In a preferred embodiment, the carrier may be present in an amount ranging from about 35 wt. % to about 60 wt. % (including all values and sub-ranges there-between)—based on the total weight of the wet-state coating.

After application of the wet-state coating, the substrate may be dried for a period of time such that the carrier is driven off (referred to as the "drying stage"), thereby forming the dry-state coating on the substrate. In some embodiments, the wet-state coating may be dried at a drying temperature that is about room temperature. In other embodiments, the wet-state coating may be dried at a drying temperature that is an elevated temperature ranging from about 40° C. to about 180° C.—including all temperature and sub-ranges there-between. The resulting dry-state coating may form a continuous coating or a discontinuous coating on the substrate.

When performing the drying stage at the elevated temperature, the reduced solids content of the wet-state coating of the present invention provides for additional amounts of carrier that help prevent the building panel and reducing composition from over-heating. Stated otherwise, the additional amounts of carrier in the wet-state coating help protect both the substrate and the reducing composition from oxidizing during the elevated temperatures of the drying stage—which would degrade the VOC and odor neutralization/reduction performance of the reducing composition. Thus, by using a carrier concentration of at least about 25 wt. % and up to about 75 wt. % (based on the total weight of the wet-state coating), the building panel of the present invention can be manufactured efficiently (i.e. at higher drying temperatures) without increased risk of degrading the VOC and odor-neutralizing/reducing characteristics of the coating.

As the concentration of carrier increases and the solids content decreases, the wet-state coating may thin beyond a suitable application viscosity. Suitable application viscosity of the wet-state coating may range from about 200 cps to about 4,000 cps at room temperature—preferably about 400 to about 3,000 cps at room temperature—including all values and sub-ranges there-between. The recited viscosity is measured on a Brookfield viscometer at 10 RPMs. To maintain the desired application viscosity in the wet-state, coating may further comprise a rheology modifier. Even at comparatively low solid content, the rheology modifier will interact with the carrier and thicken the wet-state coating to achieve the viscosity needed for application the wet-state coating onto the substrate.

The rheology modifier may be selected from compounds that do not interfere with the odor neutralizing performance of the reducing composition. Suitable rheology modifiers may include one or more clay particles (e.g., kaolin), non-ionic surfactant, ionic-surfactant and combinations thereof. The amount of rheology modifier may depend on the solids content of the wet-state coating as well as the specific type of rheology modifier.

According to some embodiments, the rheology modifier may include silicate minerals, alkali-swellable compounds, and combinations thereof that are present in an amount ranging from about 0.1 wt. % to about 55 wt. % based on the total weight of the coating in the dry-state—including all values and sub-ranges there-between. According to some embodiments, the rheology modifier may be an alkali-swellable compound that is present in an amount ranging from about 0.1 wt. % to about 2.0 wt. % (including all values and sub-ranges there-between)—based on the total weight of the dry-state coating. In other embodiments, the rheology modifier may be a silicate mineral that is present in an amount ranging from about 1 wt. % to about 55 wt. % (including all values and sub-ranges there-between)—based on the total weight of the dry-state coating. In a preferred embodiment, the rheology modifier may comprise a silicate mineral in an amount ranging from about 0.5 wt. % to about 55 wt. % (including all values and sub-ranges there-between)—based on the total weight of the dry-state coating.

A non-limiting example of silicate mineral includes kaolin particles. The kaolin particles may have an average particle size ranging from about 0.5 μm to about 30 μm—including all sizes and sub-ranges there-between. The kaolin particles may have a density ranging from about 2 g/cm$^3$ to about 4 g/cm$^3$—including all densities and sub-ranges there-between. In a preferred embodiment, the kaolin particles may have a size distribution that has about 0.3% of the particles retained on a 325 mesh screen and a density of about 2.6 g/cm$^3$—commercially available as EG-44 from Thiele Kaolin Company.

In the wet-state, the rheology modifier comprising at least one of silicate mineral, alkali-swellable compound, or combinations thereof, may be present relative to the carrier in a weight ratio ranging from about 1:1.5 to about 1:10—including all ratios and sub-ranges there-between.

Other suitable rheology modifiers may comprise surfactant (including emulsifier). The surfactant may be ionic, non-ionic, or combinations thereof. The surfactant may be present in an amount ranging from about 0.1 wt. % to about 17.0 wt. % (including all values and sub-ranges there-between)—based on the total weight of the coating in the dry-state.

The non-ionic surfactant may be present in an amount ranging from about 0.1 wt. % to about 0.5 wt. % based on the total weight of the dry-state coating. Suitable non-ionic surfactant may include linear or branched ethoxylated alcohol—such as ethoxylated trimethylol nonanol—commercially available as Tergitol TMN6. The ionic surfactant may be present in an amount ranging from about 1 wt. % to about 7 wt. % based on the total weight of the dry-state coating. The ionic surfactant may include sodium-based salts of alkyl (C12 to C16) carboxylates or sulfonates. The emulsifier may be present in an amount ranging from about 2 wt. % to about 12 wt. % based on the total weight of the dry-state coating. Non-limiting examples of emulsifier include C14 to C20 fatty acids—such as 9-octadecenoic acid.

The coating may further comprise other components such as a binder. The binder may be present in the coating in an amount ranging from about 4 wt. % to about 16 wt. % (including all values and sub-ranges there-between)—based on the total weight of the coating in the dry-state. The binder may include copolymer formed from a latex (i.e., aqueous dispersion of polymer), wherein the copolymer is formed from monomers including vinyl chloride, ethylene, and amide-monomer (e.g., acrylamide, methacrylamide)—commercially available as VINNOL 4530. Other non-limiting examples of binder include polymers based on styrene, butadiene, acrylate, methacrylate, acrylic or polyol chemistries, epoxy, urethane, and polyurea.

The coating of the present invention may further comprise filler. The filler may comprise one or more inorganic particles. Non-limiting examples of such inorganic particles include limestone, calcium carbonate, dolomite, titanium dioxide, talc, perlite, gypsum, calcite, aluminum trihydrate, zinc oxide, and combinations thereof. The inorganic particles may have a particle size ranging from about 0.1 μm to about 300 μm—including all values and sub-ranges there-between. The inorganic particles may be present in an amount ranging from about 0 wt. % to about 60 wt. % (including all values and sub-ranges there-between)—based on the total weight of the coating in the dry-state.

According to some embodiments, the auxiliary inorganic particles may be calcium carbonate. The calcium carbonate particles may be entirely solid or may be porous. The calcium carbonate particles may have an average particle size ranging from about 0.5 μm to about 300—including all values and sub-ranges there-between. The calcium carbonate particles may have a density ranging from about 1 g/cm³ to about 4 g/cm³—including all values and sub-ranges there-between. In a preferred embodiment, the calcium carbonate may be solid and have an average particle size of about 6 μm and a density of about 2.7 g/cm³. In some embodiments, the porous calcium carbonate particles may an average particle size about 2 μm to about 16 μm—with a $d_{50}$ (particle size distribution value) of about 6.5 μm. The porous calcium carbonate particles may have a surface area ranging from about 120 m²/g to about 160 m²/g—preferably about 144 m²/g.

The coating may further comprise auxiliary components such as defoamer in an amount ranging from about 0.05 wt. % to about 0.2 wt. % (including all values and sub-ranges there-between)—based on the total weight of the coating in the dry-state.

Non-limiting examples of defoamer may include polyalphaolefin formed from one or more monomers of 1-hexene, 1-heptene, 1-octene, 1-nonene, 1-decene, 1-undecene, 1-tridecene, 1-tetradecene, 1-pentadecene, 1-hexadecene, 1-octadecene, 1-heptadecene, and 1-nonadecene; a high density polymer selected from oxidized ethylene homopolymers, polyethylene homopolymers, and polypropylene homopolymers; a silicone oil, polypropylene glycol, and diethylenetriamine; and a non-ionic surfactant compound selected from polyether modified polysiloxane, polyethylene glycol oleate, and polyoxypropylene-polyoxyethylene copolymer—as well as mixtures thereof. In a preferred embodiment, the defoamer may comprise an organo-silicone compound represented by the following formula II

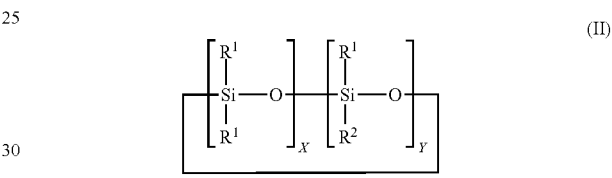

Wherein each $R^1$ is a monovalent hydrocarbon group of one to eighteen (18) carbon atoms, $R^2$ is a monovalent hydrocarbon group of one to eighteen (18) carbon atoms or an organic substituent, and x and y are each not less than 1, providing x+y equals a number between 3 to 8. A non-limiting of an organo-silicone defoamer includes octamethyl cyclotetrasiloxane—commercially available as Foam Blast 4288.

The coating may further comprise auxiliary components such as a biocide in an amount ranging from about 0.005 wt. % to about 0.05 wt. % (including all values and sub-ranges there-between)—based on the total weight of the coating in the dry-state. The term biocide refers to a compound that helps prevent undesirable biological growth, for example, algal, barnacle or fungal growth on submerged, partially submerged or damp exposed structures in aquatic environments or fungal growth in hydrocarbon fuels.

Non-limiting examples of biocides include 2,5-dimethyl-1,3,5-thiadiazinane-2-thione (also referred to as "Dazomet"), tetra is hydroxylmethyl phosphonium sulfate (THPS), 1,5-pentanedial (glutaraldehyde), dibromocyanoacetamide (DBNPA), methylene bis(thiocyanate) (MBT), N-Alkyl dimethyl-benzyl ammonium chloride (ADBAC quats), cocodiamines, 2-bromo-2-nitro-propane-1,3-diol (BNPD), 5-chloro-2-methyl-4-isothiazolin-3-one & 2-methyl-4-isothiazolin-3-one (CIT/MIT), 1,2-benziosothiazolin-3-one (RIF), sodium ortho-phenylphenate (OPP), sodium dimethyldithiocarbamate (SDM), disodium ethylene bisdithiocarbamate, methyl dithiocarbamate (METAM), 2-octyl-2H-isothiazol-3-one (OIT), and combinations thereof. In a preferred embodiment, the biocide comprises 2,5-dimethyl-1,3,5-thiadiazinane-2-thione.

As previously discussed, the wet-state coating may be applied to at least one of the first or second major surfaces of the substrate. The wet-state coating composition may be prepared by mixing together the reducing composition, binder, carrier and rheology modifier as well as other auxiliary components such as binder and optionally filler, biocides, and defoamer. The carrier may be present in an amount ranging from about 25 wt. % to about 75 wt. % based on the total weight of the wet-state coating—yielding a solids content of about 25 wt. % r, to about 75 wt, %—including all percentages and sub-ranges there-between. In a preferred embodiment, the carrier may be present in an amount ranging from about 35 wt. % to about 65 wt. %, thereby yielding a solids content of about 35 wt. to about 65 wt. % (including all values and sub-ranges there-between)—based on the total weight of the wet-state coating.

The amount of each non-carrier component in the wet-state can be calculated by multiplying the solids % of the wet-state with the amount of the non-carrier component in the dry-state. For example, for a dry state coating composition comprising 8 wt. % of ethylene urea formed from a wet-state coating composition having a solids content of 45%—the wet-state coating composition would have comprised 3.6 wt. % of ethylene urea (45%×8%=3.6%).

The resulting wet-state coating composition may be stirred at room temperature for a predetermined period of time to ensure the solid components have a substantially uniform distributed throughout the wet-state coating composition. The wet-state coating composition may have a viscosity ranging from about 200 cps to about 4,000 cps at room temperature—preferably about 400 to about 3,000 cps at room temperature—including all values and sub-ranges there-between. The recited viscosity is measured on a Brookfield viscometer at 10 RPMs.

The resulting wet-state composition may be applied to at least one major surface of the substrate by spray coating, roll coating, dip coating, or brush coating. The substrate may have a prime coat pre-applied to the major surface before application of the wet-state coating. The resulting wet-state coating may as a single coat or a plurality of coats (e.g., 2, 3, 4, 5, 6, 7, 8, etc.) so long as the resulting amount of wet-state coating present on the substrate ranges from about 100 g/m$^2$ to about 1000 g/m$^2$—including all values and sub-ranges there-between. In a preferred embodiment, the total amount of wet-state coating present on the substrate ranges from about 200 g/m$^2$ to about 600 g/m$^2$—including all values and sub-ranges there-between.

The wet-state coating of the preset invention exhibits improved water retention and does not dewater quickly. Therefore, wet-state coating of the present invention is particularly suitable for application to the substrate by roll-coating because wet-state coating will not dewater during processing and accumulate on the roll. Rather, enhanced water retention allows for the wet-state coating to be readily transferable from the roller to the substrate on each roll-application.

After each application of the wet-state coating to the substrate, the wet-state coating and the substrate may be dried for a predetermined period of time. According to some embodiments, the wet-state coating may be dried at room temperature. According to other embodiments, the wet-state coating may be dried with the addition of heat at the drying temperature ranging from about 40° C. to about 180° C.—including all values and sub-ranges there-between. Drying may be facilitated by the addition of external heat from one or more heating lamps or an oven.

Alternatively, one or more additional applications of wet-state coating may be applied prior to drying the previously applied wet-state coating. After drying, the dry-state coating may be present on the substrate in an amount ranging from about 50 g/m$^2$ to about 400 g/m$^2$—including all values and sub-ranges there-between.

In an alternative embodiment, the present invention may be directed to a VOC and odor-reducing coating comprising an odor-reducing composition (referred to herein as "reducing composition") that consists essentially of silica gel. In such embodiments, the aforementioned discussion with respect to all other components in the coating (e.g., rheology modifier, binder, biocides, filler, carrier, defoamer, etc.) as well as method of production—in both in the wet-state and the dry-state—apply to the alternative embodiment that has a reducing composition consisting essentially of silica gel. According to the present invention, the phrase "consisting essentially of" means compounds that do not interfere with the odor neutralizing performance of the reducing composition.

According to such alternative embodiments, the silica gel may be present in an amount ranging from about 5 wt. % to about 40 wt. % (including all values and sub-ranges there-between)—based on the total weight of the coating in the dry-state. The silica gel may be present in an amount ranging from about 12 wt. % to about 28 wt. % (including all values and sub-ranges there-between)—based on the total weight of the coating in the dry-state. In a preferred embodiment, the second component of the reducing composition may be present in an amount ranging from about 12 wt. % to about 24 wt. % (including all values and sub-ranges there-between)—based on the total weight of the coating in the dry-state.

The building panel of the present invention may be a ceiling panel or tile, wall panel, wall covering (e.g., wallpaper) or directly to a wall (e.g., painted dry wall, wood wall paneling, such as wainscot, baseboard molding, crown molding). In other embodiments, the coating composition may be applied directly to a glass surface (e.g., a door, a window, etc.). In other embodiments of the present invention, the coating composition may be applied various textiles—such as felts, upholstery, or window hangings (e.g., curtains), and various paper products (e.g., paper towels, coated paper, cardboard, and the like), decorative shower-curtaining liners. In other embodiments, the coating composition may be applied to a window blind (formed from cellulosic material, polymeric material, or inorganic material). The coating composition may be applied to other various indoor surfaces for the purpose of reducing VOCs and odor in a closed-environment. In other embodiments, the coating composition may be applied to packaging products (e.g., styrofoam, recycled packaging).

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

EXAMPLES

Examples 1-8

Examples 1-6 demonstrate the synergistic benefit of the reducing composition comprising ethylene urea and silica of the present invention over previously known VOC and/or odor-reducing compositions. Examples 7-8 demonstrate the surprising performance of the reducing composition consisting essentially of silica gel for reducing ammonia-based VOC and/or odors.

Described in Tables 1 and 2 (below) are eight (8) exemplary VOC and odor-reducing coatings of the present invention (Ex. 1-Ex. 8), along with the compositions for fourteen (14) comparative compositions (Comp. Ex. 1-Comp. Ex. 14), as well as two controls (Control 1 and Control 2) where no VOC and/or odor-reducing coating composition applied. The compositions of Examples 1-8 and Comparative Examples 1-14 include the following components:

i. Silica gel
 ii. Ethylene Urea
 iii. Zeolite
 iv. Zinc Salt—an odor neutralizing composition commercially available as Flexisorb OD-300
 v. Kaolin—rheology modifier comprising kaolin particles having a particle size distribution where 0.3% is retained on a 325 mesh screen.
 vi. Solid $CaCO_3$—solid calcium carbonate having a particle size of about 6 μm and a density of about 2.7 $g/cm^3$
 vii. Porous $CaCO_3$—porous calcium carbonate having a particle size have a particle size distribution that includes a $d_5$) of about 6.6 μm and a $d_{98}$ of about 15 μm and a surface area of about 144 $m^2/g$.—commercially available as OMYA TP-2553/J.
 viii. Binder—terpolymer of vinyl chloride, ethylene, and amide-monomer (e.g., acrylamide, methacrylamide)—commercially available as VINNOL 4530
 ix. Surfactant 1—ethoxylated trimethylol nonanol—commercially available as Tergitol TMN6)
 x. Surfactant 2—surfactant (such as 9-octadecenoic acid
 xi. Surfactant 3—alkyl (C14-C16) olefin sulfonate,
 xii. Auxiliary—various amounts of defoamer (such as octamethyl cyclotetrasiloxane—commercially available as Foam Blast 4288) and biocide (such as 2,5-dimetlayl-1,3,5-thiadiazinane-2-thione).

Specifically, the coating composition of each example was prepared in a wet-state and applied to a major surface of a substrate. The wet-state odor-reducing coating was then dried and the carrier driven off, thereby yielding a dry-state coating. Each substrate coated with dry-state coating was placed in a glass desiccator with a predetermined amount of VOC. A fan was provided in the glass desiccator for circulation. Using colorimetric gas detector tubes, the amount of VOC was measured after predetermined time intervals. A control was also prepared with no dry-state VOC and/or odor-reducing coating composition, to determine the un-aided reduction in VOC over time. The absorption information is shown below in Tables 1 and 2.

TABLE 1

| Aldehyde Reduction | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Control 1 |
|---|---|---|---|---|---|---|---|---|---|---|---|---|
| | | | | | | Dry-State | | | | | | |
| Ethylene Urea | 8% | 8% | 8% | 12% | — | — | 8% | 8% | 8% | 6% | 6% | — |
| Silica Gel | 19.4% | 21.1% | 21.1% | — | 21.1% | 21.1% | — | — | — | — | — | — |
| Zeolite | — | — | — | — | — | — | — | — | — | — | 50.1% | — |
| Zinc Salt | — | — | — | — | — | — | — | — | — | 6.4% | 6.4% | — |
| Kaolin | 49.2% | 25.5% | 27.3% | 74.2% | 53.5% | 30% | 46.8% | 49.7% | — | 31.1% | 31.1% | — |
| Solid $CaCO_3$ | — | 20% | — | — | — | 23.5% | 36.7% | 33.8% | — | — | — | — |
| Porous $CaCO_3$ | — | — | 18.2% | — | — | — | — | — | 83.5% | 50.1% | — | — |
| Binder | 8.3% | 9% | 9% | 12.6% | 9% | 9% | 8% | 8% | 8% | 6% | 6% | — |
| Surfactant 1 | 0.4% | 0.4% | 0.4% | 0.5% | 0.4% | 0.4% | 0.4% | 0.4% | 0.4% | 0.3% | 0.3% | — |
| Surfactant 2 | 9.7% | 10.6% | 10.6% | — | 10.6% | 10.6% | — | — | — | — | — | — |
| Surfactant 3 | 4.8% | 5.3% | 5.3% | — | 5.3% | 5.3% | — | — | — | — | — | — |
| Auxiliary | 0.2% | 0.1% | 0.1% | 0.7% | 0.1% | 0.1% | 0.1% | 0.1% | 0.1% | 0.1% | 0.1% | — |
| | | | | | | | | | | | | |
| Total Solids | 100% | 100% | 100% | 100% | 100% | 100% | 100% | 100% | 100% | 100% | 100% | — |
| | | | | | | Wet-State* | | | | | | |
| Solids % | 51.6% | 44.4% | 41.3% | 51.5% | 51.3% | 51.3% | 50.6% | 55.9% | 28.6% | 45.5% | 53.4% | — |
| Water % | 48.4% | 55.6% | 58.7% | 48.5% | 48.7% | 48.7% | 49.4% | 44.1% | 71.4% | 54.5% | 46.6% | — |
| | | | | | | Aldehyde Reduction | | | | | | |
| 1 Hour | 75% | 75% | 87.5% | 37.5% | 0% | 0% | 0% | 67.5% | 50% | 42.5% | 25% | 0% |
| 4 Hours | 85% | 85% | 100% | 47.5% | 25% | 0% | 37.5% | 75% | 67.5% | 62.5% | 50% | 0% |
| 6 Hours | 100% | 90% | 100% | 55% | 25% | 12.5% | 37.5% | 85% | 75% | 100% | 100% | 0% |
| 8 Hours | 100% | 96.3% | 100% | 70% | 25% | 12.5% | 70% | 100% | 100% | 100% | 100% | 12.5% |
| 24 Hours | 100% | 100% | 100% | 85% | 30% | 83.3% | 62.5% | 100% | 100% | 100% | 100% | 83.3% |

*The specific amount of each component in the wet-state can be calculated by multiplying the solids % with the amount weight percentage in the dry-state. For instance, the ethylene urea in Ex. 1 is present in the wet-state by an amount of 4.13 wt. % based on the total weight of the wet-state coating composition (8% × 51.6% = 4.13%)

TABLE 2

| Ammonia Reduction | Ex. 4 | Ex. 5 | Ex. 6 | Ex. 7 | Ex. 8 | Comp. Ex. 9 | Comp. Ex. 10 | Comp. Ex. 11 | Comp. Ex. 12 | Comp. Ex. 13 | Comp. Ex. 14 | Control 2 |
|---|---|---|---|---|---|---|---|---|---|---|---|---|
| Dry-State | | | | | | | | | | | | |
| Ethylene Urea | 8% | 8% | 8% | — | — | 12% | 8% | 8% | 8% | 6% | 6% | — |
| Silica Gel | 19.4% | 21.1% | 21.1% | 21.1% | 21.1% | — | — | — | — | — | — | — |
| Zeolite | — | — | — | — | — | — | — | — | — | — | 50.1% | — |
| Zinc Salt | — | — | — | — | — | — | — | — | — | 6.4% | 6.4% | — |
| Kaolin | 49.2% | 25.5% | 27.3% | 53.5% | 30% | 74.2% | 46.8% | 49.7% | — | 31.1% | 31.1% | — |
| Solid CaCO$_3$ | — | 20% | — | — | 23.5% | — | 36.7% | 33.8% | — | — | — | — |
| Porous CaCO$_3$ | — | — | 18.2% | — | — | — | — | — | 83.5% | 50.1% | — | — |
| Binder | 8.3% | 9% | 9% | 9% | 9% | 12.6% | 8% | 8% | 8% | 6% | 6% | — |
| Surfactant 1 | 0.4% | 0.4% | 0.4% | 0.4% | 0.4% | 0.5% | 0.4% | 0.4% | 0.4% | 0.3% | 0.3% | — |
| Surfactant 2 | 9.7% | 10.6% | 10.6% | 10.6% | 10.6% | — | — | — | — | — | — | — |
| Surfactant 3 | 4.8% | 5.3% | 5.3% | 5.3% | 5.3% | — | — | — | — | — | — | — |
| Auxiliary | 0.2% | 0.1% | 0.1% | 0.1% | 0.1% | 0.7% | 0.1% | 0.1% | 0.1% | 0.1% | 0.1% | — |
| Total Solids | 100% | 100% | 100% | 100% | 100% | 100% | 100% | 100% | 100% | 100% | 100% | — |
| Wet-State* | | | | | | | | | | | | |
| Solids % | 51.6% | 44.4% | 41.3% | 51.3% | 51.3% | 51.5% | 50.6% | 55.9% | 28.6% | 45.5% | 53.4% | — |
| Water % | 48.4% | 55.6% | 58.7% | 48.7% | 48.7% | 48.5% | 49.4% | 44.1% | 71.4% | 54.5% | 46.6% | — |
| Ammonia Reduction | | | | | | | | | | | | |
| 1 Hour | 90.6% | 87.5% | 76.3% | 93.7% | 72.5% | 84.4% | 72.5% | 50% | 75% | 62.5% | 72.5% | 72.5% |
| 4 Hours | 93.1% | 90.3% | 81.3% | 95.3% | 86.3% | 85.9% | 72.5% | 65% | 75% | 75% | 75% | 87.5% |
| 6 Hours | 95% | 90.5% | 87.5% | 96.3% | 88.8% | 88.8% | 75% | 78.8% | 87.5% | 81.3% | 81.3% | 87.5% |
| 8 Hours | 97.5% | 91.3% | 93.8% | 96.3% | 90% | 89% | 75% | 87.5% | 93.8% | 87.5% | 87.5% | 87.5% |
| 24 Hours | 100% | 95.8% | 97.5% | 98% | 91.7% | 94.5 | 81.3% | 93.8% | 97.5% | 95% | 95% | 91.7% |

*The specific amount of each component in the wet-state can be calculated by multiplying the solids % with the amount weight percentage in the dry-state. For instance, the ethylene urea in Ex. 1 is present in the wet-state by an amount of 4.13 wt. % based on the total weight of the wet-state coating composition (8% × 51.6% = 4.13%)

As demonstrated by Tables 1 and 2, the reducing composition of the present invention is capable of neutralizing a variety of VOCs (e.g., ammonia and aldehyde). Furthermore, as demonstrated by Table 1, the reducing composition of the present invention provides superior VOC reduction (reaching 100% in some examples) as compared to zinc-salts, zeolites, and individual systems based solely on ethylene urea.

Furthermore, as demonstrate by Table 1, the reducing composition of the ethylene urea (i.e., first component of the reducing composition) and the silica gel (i.e., the second component of the reducing composition) creates an unexpected synergistic effect in that in the amount of VOC that can be neutralized in a given amount of time. Specifically, the amount of VOC neutralized by the reducing composition of the first and second components (see Examples 1, Hour 1 to Hour 4) is greater than the sum of the VOC that was neutralized by each of the first component and the second components used separately (see Ex. 1 and Comp. Ex. 1 and 2—summarized below in Table 3).

TABLE 3

| Aldehyde Reduction | 1 Hour | 4 Hours | 6 Hours |
|---|---|---|---|
| Comp. Ex. 1 | 37.5% | 47.5% | 55% |
| Comp. Ex. 2 | 0% | 25% | 25% |
| Sum of Comp. Ex. 1 & 2 | 37.5% | 72.5% | 80% |
| Example 1 | 75% | 85% | 100% |

Thus, as demonstrated by Table 3, the reducing composition of the present invention surprisingly creates an synergistic advance in VOC and odor neutralization—as evidenced by the greater amount of VOC reduction compared to the summation of VOC-neutralizing power for an individual ethylene urea based reduction composition (i.e., Comp. Ex. 1) and an individual silica gel based reduction composition (i.e., Comp. Ex. 2).

Additionally, as demonstrate by Table 1, the at least partial substitution of kaolin and/or solid CaCO$_3$ particles for porous CaCO$_3$ particles results in faster VOC neutralization/reduction by the coating. The improvement in VOC neutralization is summarized below in Table 4.

TABLE 4

| Aldehyde Reduction | Ex. 1 (Kaolin) | Ex. 2 (Kaolin/ Solid CaCO$_3$) | Ex. 3 (Kaolin/ Porous CaCO$_3$) |
|---|---|---|---|
| 1 Hour | 75% | 75% | 87.5% |
| 4 Hour | 85% | 85% | 100% |
| 6 Hours | 100% | 90% | 100% |
| 8 Hours | 100% | 96.3% | 100% |

Thus, as demonstrated by Table 4, the addition of porous CaCO$_3$ surprisingly creates an synergistic advance in VOC and odor neutralization—as evidenced by the greater amount of VOC reduction in Example 3 compared to the amount of VOC reduction in either Example 1 or Example 2.

Additionally, as demonstrate by Table 2, the reducing composition consisting essentially of silica gel provides an unexpected performance in VOC reduction in the amount of ammonia that can be neutralized in a given amount of time. Specifically, the amount of ammonia neutralized by the reducing composition consisting essentially of silica gel (see Examples 7 and 8, Hour 1 to Hour 4) is greater than using ethylene urea alone (Comparative Example 9) and substantially equal to the superior VOC and odor reducing performance of the Examples 4-6

Example 9

Example 9 demonstrates the effect of relative humidity (RH) on zeolite-based VOC and/or odor-reducing agents on aldehyde odors. A second building panel comprising the second zeolite-based reducing agent was tested.

The first building panel was placed in a controlled environment having 0% RH and exposed to a first predetermined amount of formaldehyde (1.15 ppm). After a predetermined time period, the remaining amount of formaldehyde in the controlled environment was measured and compared to the initial predetermined amount, allowing for the calculation of the percentage of formaldehyde reduced in the controlled environment. The controlled environment was then cleared of the remaining formaldehyde. These steps were then repeated reusing the same first building panel with a fresh predetermined amount of formaldehyde (1.15 ppm) being reintroduced into the controlled environment at 0% RH. The same evaluation was performed on a fresh first building panel at 50% RH using a predetermined amount of formaldehyde (1.2 ppm). The percentage of formaldehyde removed from the room environment for each predetermined time period for the 0% RH and the 50% RH tests are provided in Table 5 below.

TABLE 5

| Time Period | 24 hours | 48 hours | 72 hours | 96 hours | 168 hours | 192 hours | 216 hours |
|---|---|---|---|---|---|---|---|
| Formaldehyde Reduction @ 0% RH | 84.3% | 82.6% | 81.7% | 80.9% | 78.3% | 78.3% | 77.4% |
| Formaldehyde Reduction @ 50% RH | 45% | 33% | 27.5% | 22.5% | 11.7% | 9.2% | — |

Based on the extrapolation of the recorded formaldehyde reduction percentages, the first building panel comprising the first zeolite-based reducing agent would reach saturation (i.e., no longer to absorb formaldehyde) in about 43 days (1030 hours) at 0% RH. At 50% RH the first building panel comprising the first zeolite-based reducing agent would reach saturation at about 12 days (290 hours). Thus, as demonstrated by Table 5, the atmospheric humidity in a normal room environment negatively impacts the zeolite's ability to reducing VOC and/or odor. Therefore, zeolites are ineffective as VOC and/or odor reducing agents for building panels that are installed in room environments having standard-to-high humidity, such as swamp land or tropical areas.

The second building panel was placed in a controlled environment having 0% RH and exposed to a first predetermined amount of formaldehyde (1.1 ppm). After a predetermined time period, the remaining amount of formaldehyde in the controlled environment was measured and compared to the initial predetermined amount, allowing for the calculation of the percentage of formaldehyde reduced in the controlled environment. The controlled environment was then cleared of the remaining formaldehyde. These steps were then repeated reusing the same second building panel with a fresh predetermined amount of formaldehyde (1.1 ppm) being reintroduced into the controlled environment at 0% RH. The same evaluation was performed on as fresh second building panel at 50% RH using a predetermined amount of formaldehyde (1.2 ppm). The percentage of formaldehyde removed from the room environment for each predetermined time period for the 0% RH and the 50% RH tests are provided in Table 6 below.

TABLE 6

| | 24 hours | 48 hours | 72 hours | 96 hours | 120 hours | 144 hours | 168 hours | 192 hours | 216 hours | 264 hours |
|---|---|---|---|---|---|---|---|---|---|---|
| Formaldehyde Reduction @ 0% RH | 90.2% | — | — | 70% | 69% | — | 68.2% | 67.3% | — | 65.5% |
| Formaldehyde Reduction @ 50% RH | 45.8% | 28.3% | 27.6% | — | — | 6.7% | 4.2% | 2.5% | 1.7% | — |

Based on the extrapolation of the recorded formaldehyde reduction percentages, the second building panel comprising the second zeolite-based reducing agent would reach saturation at about 47 days (1125 hours) at 0% RH. At 50% RH, the second building panel comprising the second zeolite-based reducing agent would reach saturation at about 9 days (210 hours)—thereby confirming that the presence of standard atmospheric humidity will negatively impacts the zeolites ability to act as a VOC and/or odor-reducing agent in building panels.

Example 10

Example 10 tests the effect of humidity on the silica gel based VOC and odor-reducing agent (representative of the present invention) on aldehyde. Glass slides coated with silica gel based reducing agent were placed in separate controlled environments—the first having 35% RH at 82° F. and the second having 90% RH at 82° F. A predetermined amount of formaldehyde (0.046 grams) was placed in each controlled environment and the level of formaldehyde was measured at predetermined time intervals. The amount of formaldehyde (in ppm) removed from the controlled environment for the 35% RH and the 90% RH tests are provided in Table 7 below.

TABLE 7

| Time Period | 10 min | 20 min | 30 min | 60 min | 120 min |
|---|---|---|---|---|---|
| Formaldehyde Absorption @ 35% RH and 82° F. | 1.5 | 2.0 | 3.5 | 4.0 | 5.5 |
| Formaldehyde Absorption @ 90% RH and 82° F. | 1.0 | 1.5 | 3.0 | 4.5 | 6.0 |
| Control | 1.6 | 1.6 | 2.0 | 4.0 | 8.0 |

As demonstrated by Table 7, the presence of a relative humidity as high as 90% has no effect on the silica gel acting as reducing agent at high RH. Specifically, at minimum, the silica gel exhibits substantially the same performance at 90% RH as at 35% RH and, in some cases, out-performs at a higher RH (see, 60 min, 120 min)—which is contrary to the zeolite-based reducing agent that performs substantially worse at higher RH. Therefore, the silica gel based reducing agents of the present invention provide very useful for building panels that are to be installed in standard room environments that containing normal amounts of atmospheric humidity—and especially useful in high humidity areas, such as swamp land or tropical areas.

Example 11

Example 11 tests the effect of humidity was tested on the silica gel based reducing agent on the reduction of ammonia. Glass slides coated with silica gel based reducing agent were placed in separate controlled environments—the first having 20% RH at 82° F., the second having 35% RH at 82° F., and the third having 90% RH at 82° F. A predetermined amount of ammonia (0.046 grams) was placed in each controlled environment and the level of ammonia was measured at predetermined time intervals. The amount of ammonia (in ppm) remaining in each controlled environment is provided in Table 8 below.

TABLE 8

| Time Period | 0 min | 10 min | 20 min | 30 min | 60 min | 120 min | 20 hours |
|---|---|---|---|---|---|---|---|
| NH₃ Absorption @ 20% RH and 82° F. | 130 | 60 | 41 | 30 | 20 | 12 | 4 |
| NH₃ Absorption @ 35% RH and 82° F. | 130 | 55 | 45 | 40 | 30 | 20 | 5 |
| NH₃ Absorption @ 90% RH and 82° F. | 130 | 75 | 60 | 58 | 40 | 35 | 10 |

As demonstrated by Table 8, even at a relative humidity as high as 90% has no effect on the silica gel based reducing agent to reduce VOC and odor-reducing. Specifically, at minimum, the silica-based reducing agent performs substantially the same at 20% RH, 35% RH, and 90% RH. Therefore, the silica gel based reducing agents of the present invention provide very useful for building panels that are to be installed in standard room environments that containing normal amounts of atmospheric humidity—and especially useful in high humidity areas, such as swamp land or tropical areas.

As those skilled in the art will appreciate, numerous changes and modifications may be made to the embodiments described herein, without departing from the spirit of the invention. It is intended that all such variations fall within the scope of the invention.

What is claimed is:

1. A method of forming a VOC and odor-reducing building panel comprising:
   providing a substrate;
   applying a wet-state coating to a major surface of the substrate, the wet-state coating comprising:
   ethylene urea;
   silica gel;
   rheology modifier; and
   carrier comprising water; and
   drying the wet-state coating, thereby evaporating at least 95 wt. % of the carrier to form a dry-state coating.

2. The method according to claim 1, wherein the wet-state coating is applied to a major surface of the substrate in an amount ranging from about 100 g/m² to about 1000 g/m².

3. The method according to claim 1, wherein the dry-state coating is present on the substrate in an amount ranging from about 50 g/m² to about 400 g/m².

4. The method according to claim 1, wherein the rheology modifier is selected from silicate mineral, alkali-swellable compounds, and combinations thereof.

5. The method according to claim 4, wherein the rheology modifier is present in an amount ranging from about 0.5 wt. % to about 55 wt. %, based on the total weight of the dry-state coating.

6. The method according to claim 1, wherein the water is present in an amount ranging from about 25 wt. % to about 75 wt. %, based on the total weight of the wet-state coating.

7. The method according to claim 1, wherein the wet-state coating has a viscosity ranging from about 200 cps to about 4,000 cps as measured on a Brookfield viscometer at RPM at room temperature.

8. The method according to claim 1, wherein the wet-state coating composition further comprises porous $CaCO_3$.

9. A method of forming a VOC and odor-reducing acoustic building panel comprising:
   providing an acoustic building panel substrate;
   applying a wet-state coating to a major surface of the substrate, the wet-state coating comprising:
   silica gel;
   surfactant;
   rheology modifier; and
   carrier comprising water; and
   drying the wet-state coating, thereby evaporating at least 95 wt. % of the carrier to form a dry-state coating.

10. The method according to claim 9, wherein the wet-state coating is applied to a major surface of the substrate in an amount ranging from about 100 g/m² to about 1000 g/m².

11. The method according to claim 9, wherein the dry-state coating is present on the substrate in an amount ranging from about 50 g/m² to about 400 g/m².

12. The method according to claim 9, wherein the rheology modifier is selected from silicate mineral, alkali-swellable compounds, and combinations thereof.

13. The method according to claim 12, wherein the rheology modifier is present in an amount ranging from about 0.5 wt. % to about 55 wt. %, based on the total weight of the dry-state coating.

14. The method according to claim 9, wherein the wet-state coating has a viscosity ranging from about 200 cps to about 4,000 cps as measured on a Brookfield viscometer at RPM at room temperature.

15. The method according to claim 9, wherein the wet-state coating composition further comprises porous $CaCO_3$.

16. The method according to claim 9, wherein the surfactant is a surfactant blend comprising a non-ionic surfactant and an ionic surfactant.

17. A method of forming a VOC and odor-reducing building panel comprising:
   providing a substrate;
   applying a wet-state coating to a major surface of the substrate, the wet-state coating comprising:
   silica gel;
   kaolin; and
   carrier comprising water; and
   drying the wet-state coating, thereby evaporating at least 95 wt. % of the carrier to form a dry-state coating.

18. The method according to claim 17, wherein the kaolin has an average particle size ranging from about 0.5 μm to about 30 μm.

19. The method according to claim 17, wherein the kaolin has a size distribution that has about 0.3% of the particles retained on a 325 mesh screen and a density of about 2.6 g/cm³.

20. The method according to claim 17, wherein the wet-state coating composition further comprises ethylene urea.

* * * * *